US012579834B2

(12) United States Patent (10) Patent No.: US 12,579,834 B2

Chen et al. (45) Date of Patent: Mar. 17, 2026

(54) INFORMATION EXTRACTION METHOD AND APPARATUS FOR TEXT WITH LAYOUT

(71) Applicant: Huawei Technologies Co., Ltd., Shenzhen (CN)

(72) Inventors: Minqin Chen, Shenzhen (CN); Peng Wu, Shenzhen (CN); Rongzhong Yue, Dongguan (CN); Xuan Jiang, Shenzhen (CN); Licui Hao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 18/319,896

(22) Filed: May 18, 2023

(65) Prior Publication Data

US 2023/0290169 A1 Sep. 14, 2023

Related U.S. Application Data

(63) Continuation of application No. PCT/CN2021/103501, filed on Jun. 30, 2021.

(30) Foreign Application Priority Data

Nov. 19, 2020 (CN) .......................... 202011308474.4

(51) Int. Cl.
*G06V 30/00* (2022.01)
*G06V 30/18* (2022.01)
*G06V 30/19* (2022.01)
*G06V 30/414* (2022.01)

(52) U.S. Cl.
CPC ........... *G06V 30/414* (2022.01); *G06V 30/18* (2022.01); *G06V 30/19093* (2022.01); *G06V 30/19173* (2022.01)

(58) Field of Classification Search
CPC ................. G06V 30/414; G06V 30/18; G06V 30/19093; G06V 30/19173; G06V 30/413; G06F 16/353; G06F 16/3344; G06F 16/35; G06F 40/295
See application file for complete search history.

(56) References Cited

U.S. PATENT DOCUMENTS

| | | | | |
|---|---|---|---|---|
| 10,997,195 | B1 * | 5/2021 | Sekar | ...................... G06N 20/00 |
| 2017/0293951 | A1 * | 10/2017 | Nolan | ..................... G06Q 30/04 |
| 2020/0134388 | A1 * | 4/2020 | Rohde | ..................... G06F 40/14 |
| 2020/0250459 | A1 * | 8/2020 | Sarshogh | ......... G06V 30/18057 |
| 2021/0110527 | A1 * | 4/2021 | Wheaton | .............. G06T 7/0002 |
| 2023/0290169 | A1 | 9/2023 | Chen et al. | |

FOREIGN PATENT DOCUMENTS

| | | | | |
|---|---|---|---|---|
| CN | 110414395 | A | * 11/2019 | ........... G06V 30/414 |
| CN | 11259631 | A | 6/2020 | |
| CN | 111753538 | A | 10/2020 | |
| CN | 112487138 | A | 3/2021 | |
| EP | 3267332 | A1 | 1/2018 | |
| EP | 3349124 | A1 | 7/2018 | |

* cited by examiner

*Primary Examiner* — Xiao Liu

(74) *Attorney, Agent, or Firm* — Conley Rose, P.C.

(57) ABSTRACT

An information extraction method includes: determining that a text block that belongs to a target category and that is in text with layout is to be extracted; recognizing, based on feature information at a text block granularity, the text block that belongs to the target category and that is in the text with layout; and outputting an identifier of the text block that belongs to the target category and that is in the text with layout.

20 Claims, 7 Drawing Sheets

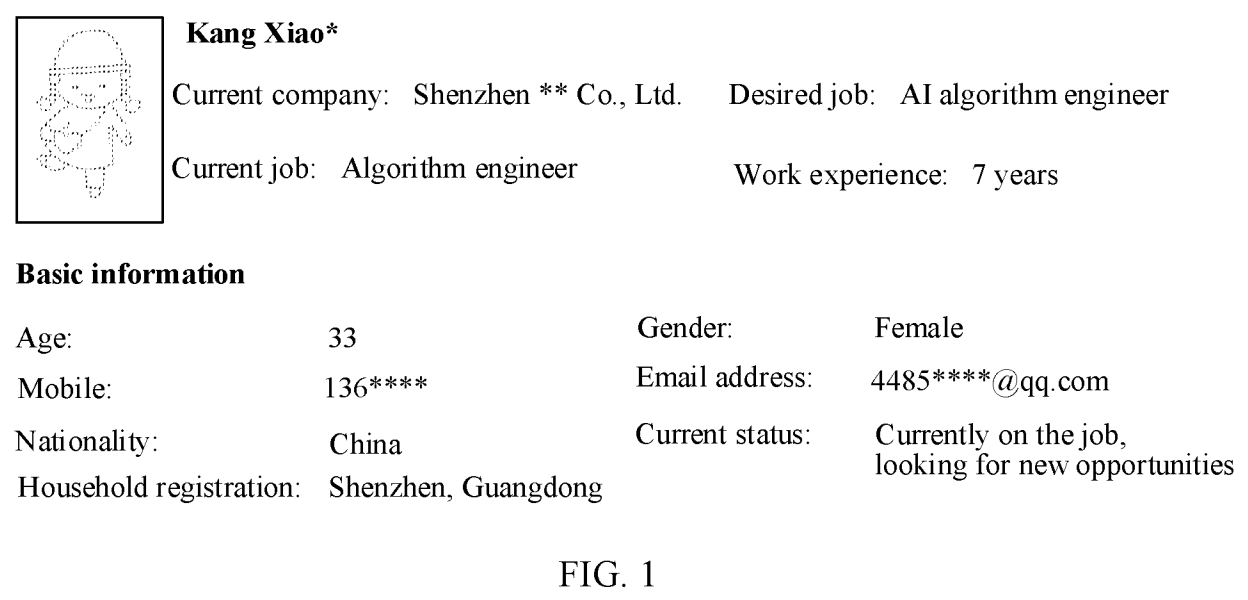

Kang Xiao\*

Current company:  Shenzhen ** Co., Ltd.    Desired job:  AI algorithm engineer

Current job:  Algorithm engineer    Work experience:  7 years

Basic information

Age:    33    Gender:    Female

Mobile:    136**    Email address:    4485**@qq.com

Nationality:    China    Current status:    Currently on the job,
                                                                        looking for new opportunities Household registration:  Shenzhen, Guangdong

FIG. 1

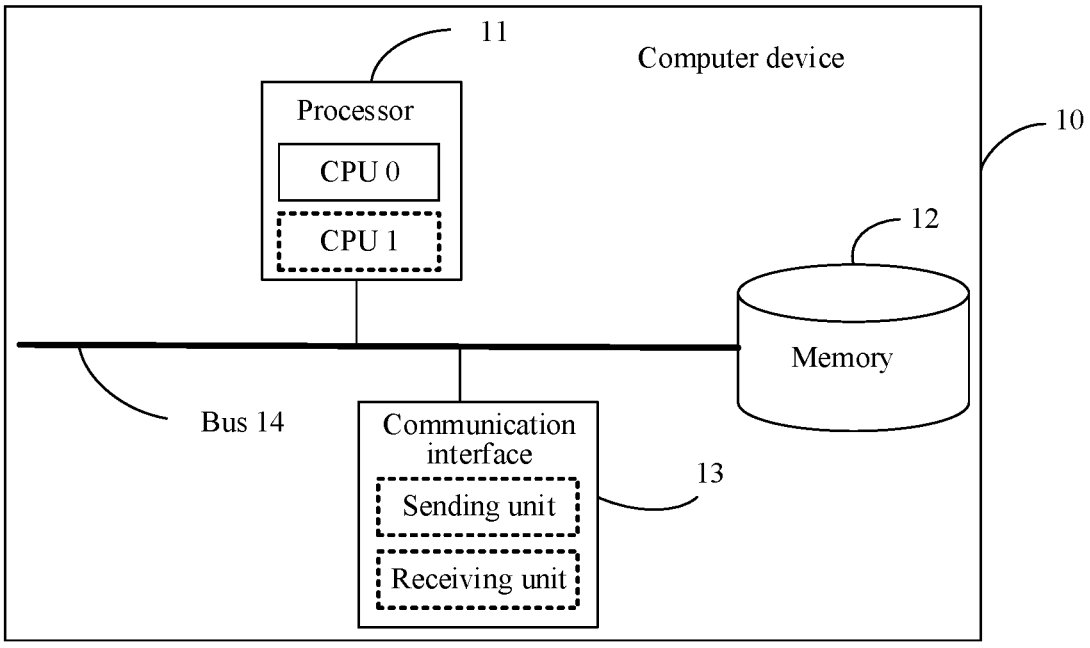

FIG. 2

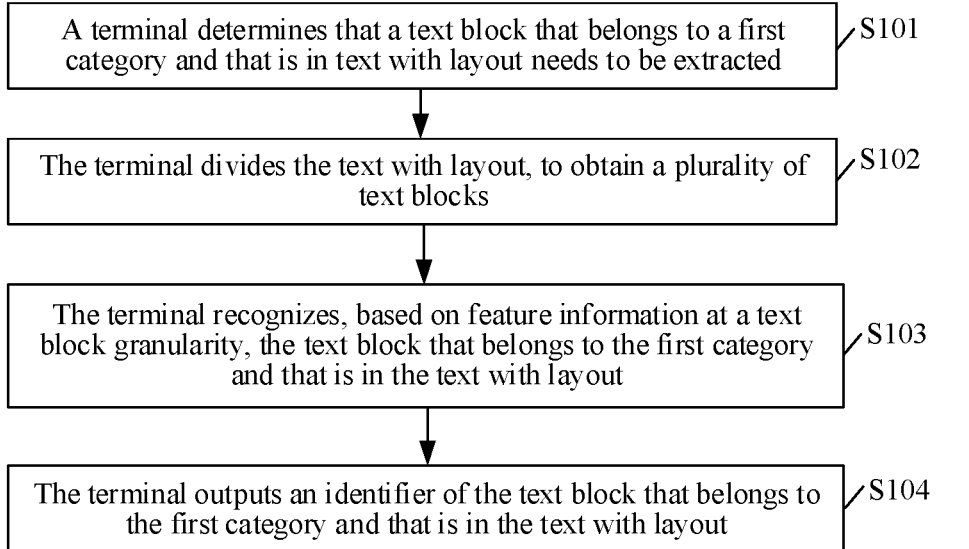

| | |
|---|---|
| A terminal determines that a text block that belongs to a first category and that is in text with layout needs to be extracted | S101 |
| The terminal divides the text with layout, to obtain a plurality of text blocks | S102 |
| The terminal recognizes, based on feature information at a text block granularity, the text block that belongs to the first category and that is in the text with layout | S103 |
| The terminal outputs an identifier of the text block that belongs to the first category and that is in the text with layout | S104 |

FIG. 3

First user interface

Enter text
with layout    401

Enter a target    402
category
              403
    Start (a)

Second user interface

Extracting    404
information...

(b)

Third user interface

Information
extraction result:

Text block 1

Text block 3

Text block 5

(c)

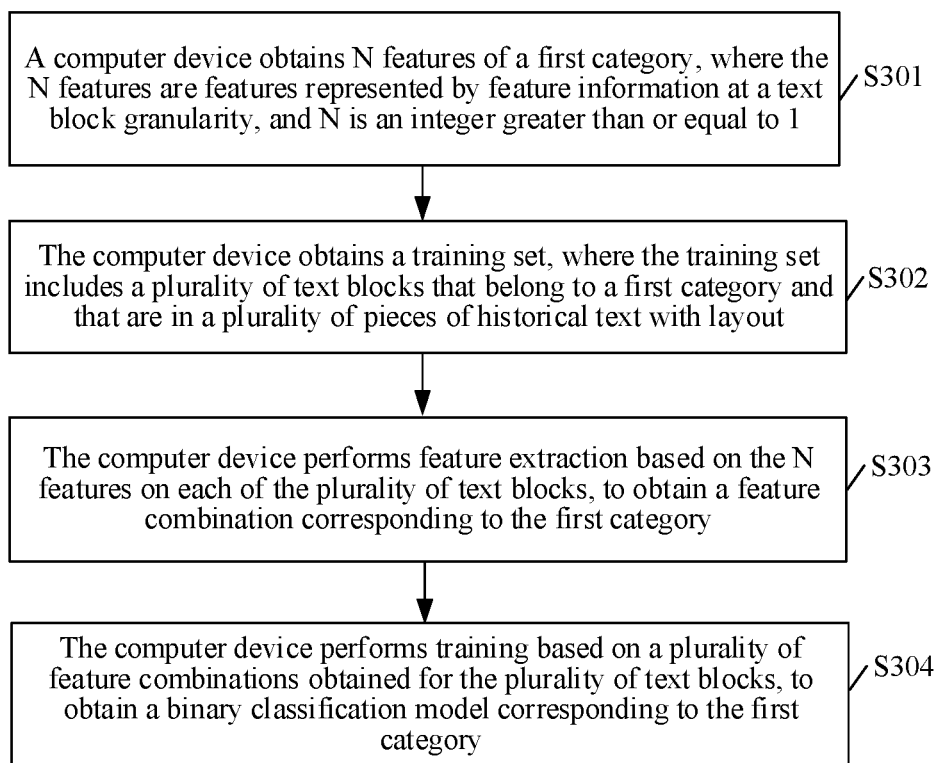

A computer device obtains N features of a first category, where the N features are features represented by feature information at a text block granularity, and N is an integer greater than or equal to 1   S301

The computer device obtains a training set, where the training set includes a plurality of text blocks that belong to a first category and that are in a plurality of pieces of historical text with layout   S302

The computer device performs feature extraction based on the N features on each of the plurality of text blocks, to obtain a feature combination corresponding to the first category   S303

The computer device performs training based on a plurality of feature combinations obtained for the plurality of text blocks, to obtain a binary classification model corresponding to the first category   S304

FIG. 6

INFORMATION EXTRACTION METHOD AND APPARATUS FOR TEXT WITH LAYOUT

CROSS-REFERENCE TO RELATED APPLICATIONS

This application is a continuation of International Patent Application No. PCT/CN2021/103501 filed on Jun. 30, 2021, which claims priority to Chinese Patent Application No. 202011308474.4 filed on Nov. 19, 2020. The disclosures of the aforementioned applications are hereby incorporated by reference in there entireties.

TECHNICAL FIELD

The present disclosure relates to the field of information technologies and the field of artificial intelligence technologies, and in particular, to an information extraction method and apparatus for text with layout.

BACKGROUND

Information extraction (IE) is an important work in natural language processing (NLP). Information extraction may be understood as: extracting, from long text based on a user requirement through some technical means, short content that meets a requirement. For example, if the user requirement is to extract "content of a desired job" from a resume, a process of implementing the requirement through some technical means is referred to as information extraction.

The text includes text with layout (TWL) (such as a resume, an air waybill, or an invoice) and text without layout. Currently, an information extraction method for text is usually an information extraction method for the text without layout.

If information extraction needs to be performed on the text with layout, the conventional technology is: first converting the text with layout into text without layout, and then performing information extraction based on a plain text feature in the text without layout. In a process of converting the text with layout into the text without layout, only data information in the text with layout is reserved. Consequently, accuracy of information extraction for the text with layout is low.

SUMMARY

Embodiments of the present disclosure provide an information extraction method and apparatus for text with layout, to help improve accuracy of information extraction for the text with layout.

To achieve the objective, the present disclosure provides the following technical solutions.

According to a first aspect, an information extraction method for text with layout is provided. The method includes: first, determining that a text block that belongs to a target category and that is in text with layout needs to be extracted; second, recognizing, based on feature information at a text block granularity, the text block that belongs to the target category and that is in the text with layout; and next, outputting an identifier of the text block that belongs to the target category and that is in the text with layout. This technical solution may be performed by a terminal or a network device. In this technical solution, the feature information at the text block granularity is directly used to perform information extraction on the text with layout. The feature information at the text block granularity is rich, and includes metadata information, spatial location information, and the like in addition to data information. Therefore, compared with a conventional technology, this helps improve accuracy of an information extraction result when feature information at a proper text block granularity is selected. In addition, this technical solution is not limited to a template for the text with layout, whether a text block crosses a line, or the like. Therefore, the technical solution has a wide application range.

In a possible design, the target category may be any category. In the following specific implementations, the target category may include a first category, a second category, or the like.

In a possible design, the recognizing, based on feature information at a text block granularity, the text block that belongs to the target category and that is in the text with layout includes: recognizing, based on feature information of a to-be-recognized text block in the text with layout, whether the to-be-recognized text block belongs to the target category. The feature information of the text block is used to recognize whether the text block belongs to the target category, and this is easy to implement.

In a possible design, the recognizing, based on feature information at a text block granularity, the text block that belongs to the target category and that is in the text with layout includes: recognizing, based on feature information of a target text block in the text with layout, whether a to-be-recognized text block in the text with layout belongs to the target category. The target text block is a text block that has a preset location relationship with the to-be-recognized text block. The technical solution is provided by considering that "a category to which a text block in text with layout belongs is affected by feature information of a text block that has a preset location relationship with the text block". Therefore, when a proper target text block is selected, this solution helps improve the accuracy of the information extraction result, and this is simple to implement.

In a possible design, the recognizing, based on feature information at a text block granularity, the text block that belongs to the target category and that is in the text with layout includes: recognizing, based on feature information of a to-be-recognized text block in the text with layout and feature information of a target text block in the text with layout, whether the to-be-recognized text block belongs to the target category. The target text block is a text block that has a preset location relationship with the to-be-recognized text block. Whether the to-be-recognized text block belongs to the target category is determined based on the feature information of the text block and the feature information of the text block that "has the preset location relationship with the text block" together, and this helps improve the accuracy of the information extraction result.

In a possible design, the target text block is a text block in a preset range of the to-be-recognized text block. In other words, the target text block is a text block that is close to the to-be-recognized text block. In this way, the accuracy of the information extraction result is further improved.

In a possible design, the target text block is a text block adjacent to the to-be-recognized text block in a preset orientation of the to-be-recognized text block. Optionally, the preset orientation may include at least one orientation of directly above, directly below, directly left, or directly right. Optionally, the preset orientation may include a horizontal orientation or a vertical orientation. In this way, when a proper preset orientation is selected, the accuracy of the information extraction result is further improved.

In a possible design, the feature information at the text block granularity includes at least one of the following: data information of the text block; metadata information of the text block; or spatial location information of the text block.

In a possible design, the data information of the text block may also be referred to as text data information of the text block, and includes: information of text data and information obtained by performing statistical analysis based on the information of the text data.

In a possible design, the data information of the text block includes at least one of the following: a total length of a character string in the text block; whether the text block includes a preset character or a preset character string; a total quantity of preset characters or preset character strings included in the text block; a proportion of preset characters or preset character strings included in the text block to characters in the text block; whether the text block includes a preset keyword; whether the text block includes a preset named entity; or whether the text block includes preset layout information. Certainly, this application is not limited thereto in specific implementation. Which data information is specifically included may be determined based on an actual requirement.

In a possible design, the metadata information of the text block includes at least one of the following: a font of the text block, a font size of the text block, a color of the text block, whether the text block is bold, whether the text block is italicized, or whether the text block is underlined. Certainly, this application is not limited thereto in specific implementation. Which metadata information is specifically included may be determined based on an actual requirement.

In a possible design, the spatial location information of the text block includes at least one of the following: a distance of the text block relative to a page edge of the text with layout, for example, at least one of a top margin, a bottom margin, a left margin, or a right margin; or a distance of the text block relative to a reference text block in the text with layout. The reference text block may be a text block that has one or more of specific data information, specific metadata information, or a specific spatial location in the text with layout.

In a possible design, the determining that a text block that belongs to a target category and that is in text with layout needs to be extracted includes: receiving a request message, where the request message is used to request to extract the text block that belongs to the target category and that is in the text with layout. In other words, a device may determine, at a request of another device, that the text block that belongs to the target category and that is in the text with layout needs to be extracted.

In a possible design, before the determining that a text block that belongs to a target category and that is in text with layout needs to be extracted, the method further includes: displaying a first user interface, where the first user interface includes first indication information and second indication information. The first indication information indicates a user to enter the text with layout, and the second indication information indicates the user to enter an identifier of the target category. In this way, human-machine interaction may be performed based on a user interface, and this helps improve user experience.

In a possible design, in the process of recognizing, based on feature information at a text block granularity, the text block that belongs to the target category and that is in the text with layout, the method further includes: displaying a second user interface, where the second user interface includes third indication information. The third indication information indicates that the user is performing an information extraction process. In this way, human-machine interaction may be performed based on a user interface, and this helps improve user experience.

In a possible design, the outputting an identifier of the text block that belongs to the target category and that is in the text with layout includes: displaying a third user interface, where the third user interface includes the identifier of the text block that belongs to the target category and that is in the text with layout. In this way, human-machine interaction may be performed based on a user interface, and this helps improve user experience.

In a possible design, the recognizing, based on feature information at a text block granularity, the text block that belongs to the target category and that is in the text with layout includes: first, obtaining a binary classification model, where the binary classification model represents whether a text block belongs to the target category; and then, inputting the feature information at the text block granularity into the binary classification model to obtain an output result. In the possible design, recognition of a text block category is converted into a binary classification problem. This is simple to implement, and is not limited to a type of and the template for the text with layout or whether a text block in the text with layout crosses a line. Therefore, the application range is wide.

In a possible design, the obtaining a binary classification model includes: obtaining N features of the target category, where the N features are features represented by the feature information at the text block granularity described above, and N is an integer greater than or equal to 1; obtaining a training set, where the training set includes a plurality of text blocks, and the plurality of text blocks all belong to the target category; performing feature extraction based on the N features on each of the plurality of text blocks, to obtain a feature combination corresponding to the target category; and performing training based on a plurality of feature combinations obtained for the plurality of text blocks, to obtain the binary classification model. The possible design provides a specific implementation of training the binary classification model. The possible design may be performed by a terminal or a network device. To be specific, the terminal or the network device obtains the binary classification model through self-training, and performs an information extraction process based on the binary classification model.

In a possible design, the method further includes: displaying a fourth user interface, where the fourth user interface includes fourth indication information and fifth indication information. The fourth indication information indicates the user to enter the identifier of the target category and the N features, and the fifth indication information indicates the user to enter the training set. In this way, human-machine interaction may be performed based on a user interface, and this helps improve user experience.

In a possible design, the method further includes: displaying a fifth user interface, where the fifth user interface includes sixth indication information. The sixth indication information indicates that the user is training the binary classification model. In this way, human-machine interaction may be performed based on a user interface, and this helps improve user experience.

In a possible design, the obtaining a binary classification model includes: receiving the binary classification model published by a network device. The possible design may be performed by a terminal. To be specific, the terminal may download the binary classification model from the network device, and perform an information extraction process based on the downloaded binary classification model.

According to a second aspect, an information extraction apparatus for text with layout is provided.

In a possible design, the information extraction apparatus for text with layout is configured to perform the information extraction method for text with layout provided in the first aspect. In this application, functional module division may be performed on the information extraction apparatus for text with layout according to the method provided in the first aspect. For example, each functional module may be obtained through division based on each corresponding function, or two or more functions may be integrated into one processing module. For example, in this application, the information extraction apparatus for text with layout may be divided into a determining unit, a recognition unit, an output unit, and the like based on functions. For descriptions of possible technical solutions performed by the foregoing functional modules obtained through division and beneficial effects, refer to the technical solutions provided in the first aspect or corresponding possible designs of the first aspect.

In another possible design, the information extraction apparatus for text with layout includes a memory and one or more processors, and the memory is coupled to the processor. The memory is configured to store computer instructions. The processor is configured to invoke the computer instructions, to perform any method according to any one of the first aspect and any possible design manners of the first aspect.

According to a third aspect, this application provides a computer-readable storage medium, for example, a non-transient computer-readable storage medium. The computer-readable storage medium stores a computer program (or instructions). When the computer program (or the instructions) is run on an information extraction apparatus for text with layout, the information extraction apparatus for text with layout is enabled to perform any method provided in any possible implementation of the first aspect.

According to a fourth aspect, this application provides a computer program product. When the computer program product runs on a computer, any method provided in any possible implementation of the first aspect is performed.

According to a fifth aspect, this application provides a chip system, including a processor. The processor is configured to invoke, from a memory, a computer program stored in the memory, and run the computer program, to perform any method provided in the implementations of the first aspect.

It may be understood that any one of the information extraction apparatus for text with layout, the computer storage medium, or the computer program product provided above may be used in the corresponding method provided above. Therefore, for beneficial effects that can be achieved by the information extraction apparatus for text with layout, the computer storage medium, or the computer program product, refer to beneficial effects in the corresponding method.

In the present disclosure, a name of the information extraction apparatus for text with layout does not constitute a limitation on devices or functional modules. During actual implementation, these devices or functional modules may have other names. Each device or functional module falls within the scope defined by the claims and their equivalent technologies in this application, provided that a function of the device or functional module is similar to that described in this application.

These aspects or other aspects in this application are more concise and comprehensible in the following descriptions.

BRIEF DESCRIPTION OF DRAWINGS

FIG. 1 is a schematic diagram of a resume applicable to an embodiment of the present disclosure;

FIG. 2 is a schematic diagram of a hardware structure of a computer device according to an embodiment of the present disclosure;

FIG. 3 is a schematic flowchart of an information extraction method for text with layout according to an embodiment of the present disclosure;

FIG. 6 is a schematic flowchart of a method for training a binary classification model according to an embodiment of the present disclosure;

DESCRIPTION OF EMBODIMENTS

Figures 4, 5:
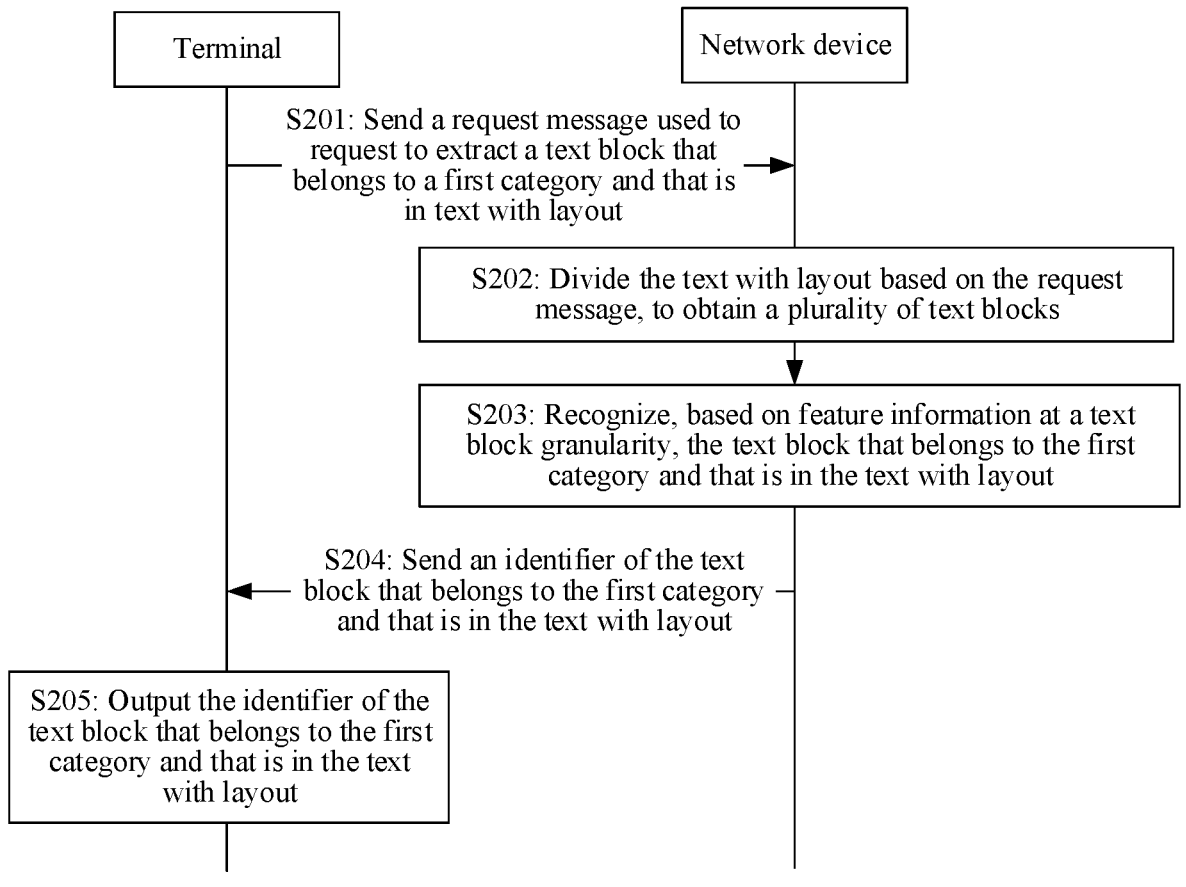
FIG. 4 is a schematic flowchart of another information extraction method according to an embodiment of the present disclosure.
FIG. 5 is a schematic diagram of a change of user interfaces in an information extraction process according to an embodiment of the present disclosure.

The following describes some terms and technologies used in the present disclosure.

(1) Text with Layout and Text without Layout

Words in text are arranged in a specified layout to form text with layout.

The text with layout includes a plurality of text blocks. The text block usually includes gathered text data, and different text blocks may be separated by spaces or the like. For example, in the resume shown in FIG. 1, "Kang Xiao*" is a text block, "Current company:" is a text block, "Shenzhen** Co., Ltd." is a text block, and other examples are not listed one by one. For a specific implementation of dividing the text with layout to obtain a plurality of text blocks, refer to a current technology.

The text with layout may not only represent data information of a text block, but also display metadata information, such as a font of the text block, a font size of the text block, a color of the text block, whether the text block is bold, whether the text block is italicized, or whether the text block is underlined; and may further represent spatial location information of the text block, such as location information of the text block in the text with layout, and a spatial location relationship between the text block and another text block. For example, text edited in a Word file may be the text with layout.

In application examples, the text with layout may include: a resume, an air waybill, an invoice, and the like.

Text without layout includes text with only one default layout (such as a font or line spacing). The text without layout represents only data information. For example, text edited in a Notepad file may be the text without layout.

(2) Type of Text with Layout and Template for Text with Layout

A type of text with layout is determined based on a function of the text with layout. For example, the type of the text with layout may include: a resume, an air waybill, an invoice, and the like. Further, the type of the text with layout may be further classified. For example, invoices may be further classified into a special invoice, a common invoice, and the like.

Text with layout belonging to a same type may have different templates. A template for the text with layout may be determined based on a meaning, an arrangement, and the like of a text block in the text with layout. For example, different templates are generally used for air waybills in different countries. For another example, resumes may have different templates.

(3) Keyword

A keyword may also be referred to as a subject word or the like, and is a word, a phrase, or an expression that represents a meaning of text.

An algorithm used to extract a keyword in text is not limited in embodiments of the present disclosure. For example, the algorithm may include at least one of the following: a term frequency-inverse document frequency (TF-IDF) algorithm, a latent dirichlet allocation (LDA) algorithm, a TextRank algorithm, or the like.

(4) Named Entity

A named entity refers to an entity with specific meanings in text, or a thing that may be identified by a proper noun (or name). A named entity generally represents a unique individual of a specific thing. For example, the individual of the specific thing may include a person name, a place name, an organization name, or other proper nouns. In addition, the individual of the specific thing may further include time, a quantity, currency, a proportional value, and the like.

(5) Other Terms

In addition, in embodiments of the present disclosure, the word "example" or "for example" is used to represent giving an example, an illustration, or a description. Any embodiment or design scheme described as an "example" or "for example" in embodiments of the present disclosure should not be explained as having more advantages than another embodiment or design scheme. Exactly, use of the word "example", "for example", or the like is intended to present a related concept in a specific manner.

The terms "first" and "second" in embodiments of the present disclosure are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the present disclosure, unless otherwise stated, "a plurality of" means two or more than two.

In this application, the term "at least one" means one or more, and the term "a plurality of" means two or more. For example, a plurality of second packets mean two or more second packets.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that sequence numbers of processes do not mean execution sequences in embodiments of the present disclosure. The execution sequences of the processes should be determined based on functions and internal logic of the processes, and should not be construed as any limitation on the implementation processes of embodiments of the present disclosure.

It should be understood that determining B based on A does not mean that B is determined based on only A, and B may alternatively be determined based on A and/or other information.

It should be further understood that the term "include" (or referred to as "includes", "including", "comprises", and/or "comprising"), when being used in this specification, specifies the presence of stated features, integers, steps, operations, elements, and/or components, but does not preclude the presence or addition of one or more other features, integers, steps, operations, elements, components, and/or groups thereof.

It should be further understood that the term "if" may be interpreted as a meaning "when" ("when" or "upon"), "in response to determining", or "in response to detecting". Similarly, based on context, a phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", and "a possible implementation" mentioned in the entire specification mean that particular features, structures, or characteristics related to an embodiment or the implementations are included in at least one embodiment of the present disclosure. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

In a conventional technology, if information extraction needs to be performed on text with layout, a conventional practice is: first converting the text with layout into text without layout, and then performing information extraction based on a plain text feature (namely, data information) in the text without layout. Methods for performing information extraction based on the plain text feature in the text without layout include the following methods.

Method 1: A regular expression (regex or RE) is used to perform information extraction. The regular expression, also known as a formal representation, a regular representation, a rule expression, a general representation, is a concept of computer science. The regular expression uses a single character string to describe and match a series of character strings that meet a syntax rule.

For example, if a regular expression for a category of "name" in text of a template is "Name: ", and a user requirement is to extract text data whose category is "name" in new text of the template, a computer device may use "Name: " to match the text data in the new text and output the matched text data.

The regular expression is strongly related to a template for text. When the template for the text changes, the regular expression becomes invalid. In this way, an application scope of the technical solution of performing information extraction by using the regular expression is limited. For example, if a "name" layout in text with a template is "Name, ", the regular expression "Name: " cannot be used for performing information extraction.

Method 2: Named entity recognition (NER) is used to perform information extraction.

This method needs to first convert a plurality of pieces of historical text with layout to text without layout respectively, and then perform sequence labeling on text data of a category in the text without layout. Then, an NER algorithm is used for performing training based on a dataset on which sequence labeling is performed, to obtain a machine learning model. Next, the machine learning model is used to recognize text data of the category in the text without layout.

There are some cross-line text blocks in the text with layout, and scanning is usually performed line by line when the text with layout is converted to the text without layout. As a result, it is possible that text data of the text blocks is cross-line and inconsecutive in the text without layout. This brings difficulties to sequence labeling, and consequently, an application scope of the technical solution of performing information extraction by using named entity recognition is limited.

For example, in the resume shown in FIG. 1, a text block "Currently on the job, looking for new opportunities" is cross-line, and when the resume is converted to text without layout, these four text blocks "Current status:", "Currently on the job, looking for new opportunities", "Household registration:", and "Shenzhen, Guangdong" may be converted into: "Current status: Currently on the job" and "Household registration: Shenzhen, Guangdong, looking for new opportunities". In addition, "Current status: Currently on the job" is in the same line, and "Household registration: Shenzhen, Guangdong, looking for new opportunities" is in another line. This shows that the text data "Currently on the job, looking for new opportunities" is cross-line and inconsecutive in the text without layout.

Based on this, embodiments of the present disclosure provide an information extraction method for text with layout. In this method, feature information at a text block granularity is directly used to perform information extraction on text with layout. The feature information at the text block granularity is rich, and includes metadata information, spatial location information, and the like in addition to data information. Therefore, compared with a conventional technology, this technical solution helps improve accuracy of an information extraction result when feature information at a proper text block granularity is selected. In addition, this technical solution is not limited to a template for the text with layout, whether a text block crosses a line, or the like. Therefore, the technical solution has a wide application range.

The technical solutions provided in embodiments of the present disclosure may be applied to a scenario including a terminal, or may be applied to a scenario including a terminal and a network device. Specific forms of the terminal and the network device are not limited in embodiments of the present disclosure. For example, the terminal may be a scanner, a digital camera, a mobile phone, a tablet computer, a desktop computer, a laptop, a handheld computer, a notebook computer, an ultra-mobile personal computer (UMPC), a netbook, a personal digital assistant (PDA), or the like. The network device may be a cloud server or the like.

When the technical solution is applied to the scenario including a terminal and a network device, the network device may be a cloud server. The cloud server is configured to provide a cloud service for the terminal, to represent that the network device has a service of performing information extraction on the text with layout. Specifically, an information extraction service is a service of "performing, based on the feature information at the text block granularity, information extraction on a text block that is of a category and that is in the text with layout". The cloud service may improve recognition accuracy of the text with layout. For example, the terminal may request the cloud service from the network device when there is a requirement to perform information extraction on the text block that is of the category and that is in the text with layout.

FIG. 2 is a schematic diagram of a hardware structure of a computer device 10 according to an embodiment of the present disclosure. The computer device may be the terminal described above, or may be the network device described above. The computer device 10 may include a processor 11, a memory 12, a communication interface 13, and a bus 14. The processor 11, the memory 12, and the communication interface 13 may be connected through the bus 14.

The processor 11 is a control center of the computer device 10, and may be a general-purpose central processing unit (CPU), another general-purpose processor, or the like. The general-purpose processor may be a microprocessor, any conventional processor, or the like.

For example, the processor 11 may include one or more CPUs, for example, a CPU 0 and a CPU 1 shown in FIG. 2.

The memory 12 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of instructions or data structure and capable of being accessed by a computer, but is not limited thereto.

In a possible implementation, the memory 12 may be independent of the processor 11. The memory 12 may be connected to the processor 11 through the bus 14, and is configured to store data, instructions, or program code. When invoking and executing the instructions or the program code stored in the memory 12, the processor 11 may implement an information extraction method for text with layout or a method for training a binary classification model provided in embodiments of the present disclosure.

In another possible implementation, the memory 12 may alternatively be integrated with the processor 11.

The communication interface 13 is configured to connect the computer device 10 to another device through a communication network, where the communication network may be an Ethernet, a radio access network (RAN), a wireless local area network (WLAN), or the like. The communication interface 13 may include a receiving unit configured to receive data and a sending unit configured to send data.

The bus 14 may be an industry standard architecture (ISA) bus, a Peripheral Component Interconnect (PCI) bus, a Peripheral Component Interconnect Express (PCIe) bus, an Extended Industry Standard Architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

It should be noted that, the structure shown in FIG. 2 does not constitute a limitation on the computer device 10. The computer device 10 may include more or fewer components than those shown in the figure in addition to the components shown in FIG. 2, or some components may be combined.

With reference to the accompanying drawings, the following describes the technical solutions provided in embodiments of the present disclosure.

FIG. 3 is a schematic flowchart of an information extraction method for text with layout according to an embodiment of the present disclosure. The information extraction method may be specifically understood as extracting text blocks that belong to one or more categories and that are in text with layout. In this embodiment, extracting a text block that belongs to a first category and that is in the text with layout is used as an example for description.

The method shown in FIG. 3 may include the following steps.

S101: A terminal determines that the text block that belongs to the first category and that is in the text with layout needs to be extracted.

The text with layout may be any text with layout that has an information extraction requirement. A type of the text with layout or a template for the text with layout is not limited in embodiments of the present disclosure.

In an example, for a paper resume, a user may photograph the paper resume by using a terminal, to obtain a picture. The terminal performs character recognition on the picture, to translate information on the paper resume into computer characters. For example, the terminal may translate the information on the paper resume into the computer characters by using an optical character recognition (OCR) technology. Text including the computer characters may be used as the text with layout in S101.

The first category may be any category of a text block having a recognition requirement. Generally, the first category is a category to which one or more text blocks in the text with layout belong.

In an example, when receiving indication information, for example, when receiving indication information entered by the user, or when receiving indication information sent by another device (e.g., a network device or another terminal), the terminal determines that the text block that belongs to the first category and that is in the text with layout needs to be extracted. The indication information includes an identifier of the text with layout and an identifier of at least one category, and indicates to extract a text block that belongs to each of the at least one category and that is in the text with layout. The terminal may use any one of the at least one category as the first category.

For example, if a user requirement is to extract "content of a desired job" from a resume, the text with layout may be the resume, and the first category may be "Desired job".

S102: The terminal divides the text with layout, to obtain a plurality of text blocks.

For a specific implementation of this step, refer to the conventional technology. Details are not described herein.

S103: The terminal recognizes, based on feature information at a text block granularity, the text block that belongs to the first category and that is in the text with layout.

Optionally, S103 may be implemented in any one of the following Manner 1 to Manner 3.

Manner 1: The terminal recognizes, based on feature information of a to-be-recognized text block in the text with layout, whether the to-be-recognized text block belongs to the first category.

Manner 2: The terminal recognizes, based on feature information of a target text block in the text with layout, whether a to-be-recognized text block belongs to the first category.

Manner 3: The terminal recognizes, based on feature information of a to-be-recognized text block in the text with layout and feature information of a target text block in the text with layout, whether the to-be-recognized text block belongs to the first category.

The to-be-recognized text block may be any one of the plurality of text blocks obtained by division in S102. For example, the terminal may sequentially use each text block as the to-be-recognized text block based on numbers of the plurality of text blocks.

Optionally, the to-be-recognized text block is a text block in which "parameter content" in the text with layout is located.

It may be understood that, in the text with layout, there is usually a case in which a parameter and parameter content are different text blocks. One parameter may correspond to one or more pieces of parameter content. For example, two words "Desired job" in a resume are a text block, and two words "Software engineer" corresponding to content of the desired job are another text block. For another example, two words "Consignor information" in an air waybill are a text block, and content of the consignor information may include "content of a consignor address", "content of a consignor name", and "content of contact method of a consignor". For example, the content of the consignor information is specifically Address A, San Zhang, and 139**. In this case, each of "Address A", "San Zhang", and "139**" is a text block.

Generally, a user requirement is to extract the parameter content, not the parameter. For example, if the user requirement is to extract a text block of the category of "Desired job" in the resume, the to-be-recognized text block may be a text block in which the "content of the desired job" is located. For another example, if a user requirement is to extract a text block of the category of "Consignor information" in the air waybill, the to-be-recognized text block may be a text block in which the "content of the consignor information" is located.

Certainly, in specific implementation, the to-be-recognized text block may alternatively be another text block in the text with layout. This is not limited in this embodiment of the present disclosure.

It may be understood that data information of a text block cannot completely represent meanings of the text block. For example, for the text block "Software engineer" in the resume, when a left neighbor (a text block on the directly left of the text block and adjacent to the text block) is "Desired job" and when a left neighbor is "Current job", "Software engineer" represents different meanings. For another example, for the text block "San Zhang" in the air waybill, when a left neighbor is "Consignor information" and when a left neighbor is "Consignee information", "San Zhang" represents different meanings.

Based on this, in some embodiments (e.g., Manner 2 or Manner 3) of the present disclosure, the terminal may recognize a category of another text block based on feature information of one text block. In Manner 2 and Manner 3, the target text block is a text block that has a preset location relationship with the to-be-recognized text block.

In a possible implementation, the target text block is a text block in a preset range of the to-be-recognized text block. The preset range may be a regular shape such as a rectangle, a circle, an ellipse, or a semicircle, or certainly may be an irregular shape. This is not limited in this embodiment of the present disclosure. In addition, a size of the preset range is not limited in embodiments of the present disclosure.

In another implementation, the target text block is a text block adjacent to the to-be-recognized text block in a preset orientation of the to-be-recognized text block. Optionally, the preset orientation may include at least one orientation of directly above, directly below, directly left, or directly right. Optionally, the preset orientation may include a horizontal orientation or a vertical orientation. A specific preset orientation or specific preset orientations may be determined based on a location of a text block related to the to-be-recognized text block in the text with layout.

The two text blocks of "Desired job" and "content of the desired job" are used as an example. Generally, the "Desired job" is located on the directly left of or directly above the "content of the desired job" and is adjacent to the "content of the desired job". Therefore, if the to-be-recognized text block is the "content of the desired job", the preset orientation may be directly left or directly above.

The following describes the feature information at the text block granularity. A text block herein may be the foregoing to-be-recognized text block, or may be the foregoing target text block.

Optionally, feature information of the text block includes at least one of the following: data information of the text block, metadata information of the text block, or spatial location information of the text block. Descriptions are provided below separately.

1. Data Information of the Text Block

The data information of the text block may also be referred to as text data information of the text block, and may include information of text data and information obtained by performing statistical analysis based on the information of the text data.

Optionally, the data information of the text block includes at least one of the following:

(1) Total length of a character string in the text block

A total length of a character string included in the to-be-recognized text may be represented by a total quantity of characters included in the character string. For example, if the text block is a character string "zhangsan", the total length of the character string in the text block is 8.

(2) Whether the text block includes a preset character or a preset character string (3) Total quantity of preset characters or preset character strings included in the text block (4) Proportion of preset characters or preset character strings included in the text block to characters in the text block Optionally, the preset character may be one or more of a letter, a digit, or a special character. Letters may be classified into an uppercase letter and a lowercase letter. For example, special characters may include at least one of the following: *, #, @, %, $, &, or the like.

Optionally, the preset character string may be a character string including one or more of a letter, a digit, or a special character.

(5) Whether the text block includes a preset keyword

The preset keyword may be extracted, by using a keyword extraction algorithm, from a text block that is of the first category and that is in a plurality of pieces of historical text with layout. There may be one or more preset keywords.

(6) Whether the text block includes a preset named entity

There may be one or more preset named entities.

(7) Whether the text block includes preset layout information

For example, the preset layout information may be a date (e.g., YYYY/MM/DD) or time (e.g., HH:MM).

2. Metadata Information of the Text Block

Optionally, the metadata information of the text block includes one or more of a font (e.g., regular script or SimSun) of the text block, a font size of the text block, a color of the text block, whether the text block is bold, whether the text block is italicized, or whether the text block is underlined.

3. Spatial Location Information of the Text Block

The spatial location information of the text block is location information of the text block in the text with layout.

In an implementation, the location information may be represented by a distance (namely, a page margin) of the text block relative to a page edge of the text with layout.

The page margin may be one or more of an upper page margin, a lower page margin, a left page margin, or a right page margin. The upper page margin is a distance between the text block and an upper boundary of the text with layout. The lower page margin is a distance between the text block and a lower boundary of the text with layout. The left page margin is a distance between the text block and a left boundary of the text with layout. The right page margin is a distance between the text block and a right page margin of the text with layout.

In another implementation, the location information may be represented by a distance of the text block relative to a reference text block in the text with layout.

The reference text block may be any text block in the text with layout.

Optionally, the reference text block is a text block that has one or more of specific data information, specific metadata information, or a specific spatial location in the text with layout. For example, in the resume shown in FIG. 1, because the text block "Kang Xiao*" is a bold text block with a largest font size, the text block may be used as the reference text block.

It should be noted that specific feature information of the text block may be determined based on an actual requirement. For example, extraction is performed on the text block of the category of "Desired job" in the resume. Assuming that the "Desired job" is usually displayed in bold, "whether the text block is bold" may be used as feature information of the text block. For another example, extraction is performed on a text block of a category of "Graduation institution" in the resume. The "Graduation institution" usually includes preset naming entities such as "university" and "college", so that "whether a university is included" or "whether a college is included" may be used as feature information of the text block.

Optionally, S103 may include: The terminal obtains a binary classification (BC) model, where the binary classification model represents whether a text block belongs to the first category. Then, the terminal inputs the feature information at the text block granularity into the binary classification model to obtain an output result.

Recognizing whether the to-be-recognized text block belongs to the first category is used as an example. The binary classification model herein corresponds to the first category, and the binary classification model is used to represent whether the text block belongs to the first category. The output result is that the to-be-recognized text block belongs to the first category, or that the to-be-recognized text block does not belong to the first category. The feature information at the text block granularity input into the binary classification model may be the feature information of the to-be-recognized text block and/or the feature information of the target text block.

Specifically, the terminal may prestore a binary classification model corresponding to each category. One binary classification model is used to determine whether a category of a text block is a category corresponding to the binary classification model. In embodiments of the present disclosure, a source of a binary classification model that corresponds to any category and that is prestored in the terminal is not limited. For example, the terminal may perform the method shown in FIG. 6, to obtain, through training, the binary classification model corresponding to the category. For another example, the terminal may download the binary classification model corresponding to the category from the network device.

In this optional implementation, recognition of a text block category is converted into a binary classification problem, and this is simple to implement, and is not limited to the type of and the template for the text with layout or whether a text block in the text with layout crosses a line. Therefore, an application range is wide.

After performing recognition on one text block in the text with layout, the terminal may use another text block in the plurality of text blocks in S102 as the to-be-recognized text block to perform S103. The rest can be deduced by analogy until the terminal uses all text blocks in the text with layout as to-be-recognized text blocks to perform S103, or until the terminal determines a preset quantity of text blocks that belong to the first category and that are in the text with layout. Certainly, an end condition is not limited thereto. Then, the terminal may perform S104.

S104: The terminal outputs an identifier of the text block that belongs to the first category and that is in the text with layout.

The identifier of the text block is used to uniquely mark the text block. For example, the terminal may number all text blocks in the text with layout together, where different text blocks have different numbers, and may use a number of each text block as an identifier of the text block.

Specifically, if it is determined in S103 that the to-be-recognized text block belongs to the first category, the identifier that is of the text block of the first category and that is output in S104 includes an identifier of the to-be-recognized text block. If it is determined in S103 that the to-be-recognized text block does not belong to the first category, the identifier that is of the text block of the first category and that is output in S104 does not include an identifier of the to-be-recognized text block.

A specific implementation in which the terminal outputs the identifier of the text block that belongs to the first category and that is in the text with layout is not limited in embodiments of the present disclosure. For example, the terminal may display the identifier of the text block that belongs to the first category and that is in the text with layout through a display apparatus (such as a display), may play the identifier of the text block that belongs to the first category and that is in the text with layout through a voice output apparatus (such as a sound box), or the like.

It should be noted that, if the terminal does not find the text block belonging to the first category, after using each text block in the text with layout as the to-be-recognized text block to perform S103, the terminal may output information that indicates that the text with layout does not include the text block belonging to the first category. Specific content of the indication information is not limited in embodiments of the present disclosure.

The foregoing describes the information extraction method for the text block of the first category. In some embodiments of the present disclosure, the terminal may separately recognize, by using S101 to S104, whether a text block in the text with layout belongs to a second category, where the second category is a category other than the first category. By analogy, text blocks of a plurality of categories in the text with layout may be extracted, thereby implementing information extraction based on the plurality of categories.

In the information extraction method provided in this embodiment of the present disclosure, the feature information at the text block granularity is directly used to implement information extraction for the text with layout. The feature information at the text block granularity is rich, and includes metadata information, spatial location information, and the like in addition to data information. Therefore, compared with a conventional technology, this technical solution helps improve accuracy of an information extraction result when feature information at a proper text block granularity is selected. In addition, this technical solution is not limited to the template for the text with layout, whether a text block crosses a line, or the like. Therefore, the technical solution has a wide application range.

It should be noted that, in the conventional technology, after the text with layout is converted into the text without layout, there is no data information at the text block granularity, but there is data information at an entire text block granularity. Consequently, in an information extraction process, complete data information of the text block may not be accurately obtained, and accuracy of information extraction for the text with layout is low. However, in the technical solution provided in this embodiment, information extraction is directly performed based on information at the text block granularity. Therefore, even if only the data information of the to-be-recognized text block is used for information extraction in this embodiment of the present disclosure, the technical solution is different from the conventional technology, and compared with the conventional technology, the technical solution helps improve accuracy of information extraction for the text with layout.

For example, in the example above of the method for performing information extraction by using named entity recognition, the text block "Currently on the job, looking for new opportunities" is cross-line and inconsecutive in the text without layout, and this brings difficulties to sequence labeling. Correspondingly, when data information of the text block "Currently on the job, looking for new opportunities" is extracted from the text without layout, accuracy is low. However, in the technical solution provided in this embodiment of the present disclosure, the terminal may directly extract complete data information of "Currently on the job, looking for new opportunities" from the text block. Therefore, the accuracy is high.

It should be noted that, the method shown in FIG. 3 is described by using an example in which the terminal performs the method, and the foregoing steps may be performed by a network device instead, to obtain a new embodiment. In addition, the information extraction method may alternatively be performed by a terminal and a network device together. This is described below in an embodiment shown in FIG. 4.

FIG. 4 is a schematic flowchart of another information extraction method according to an embodiment of the present disclosure. The method shown in FIG. 4 may include the following steps.

S201: A terminal sends a request message to a network device, where the request message is used to request to extract a text block that belongs to a first category and that is in text with layout. Optionally, the request message includes an identifier of the text with layout and an identifier of the first category.

S202: The network device divides the text with layout based on the request message, to obtain a plurality of text blocks.

S203: The network device recognizes, based on feature information at a text block granularity, the text block that belongs to the first category and that is in the text with layout.

S204: The network device sends, to the terminal, an identifier of the text block that belongs to the first category and that is in the text with layout. S204 is a specific implementation in which the network device outputs the identifier of the text block that belongs to the first category and that is in the text with layout.

S205: The terminal outputs the identifier of the text block that belongs to the first category and that is in the text with layout.

For explanations of related terms, specific implementations of related steps, and corresponding beneficial effects in this embodiment, refer to related parts in the embodiment shown in FIG. 3.

It should be noted that FIG. 3 and FIG. 4 merely show examples of application scenarios of the information extraction method for text with layout according to embodiments of the present disclosure, and specific implementation is not limited thereto.

In product implementation, in an example, the network device may publish the steps performed by the terminal in the method shown in FIG. 3 or FIG. 4 in a form of a software functional module, for example, publish the steps in a form of an application (APP) or publish, along with an APP, the steps in a form of a sub-function of the APP. The terminal may download the APP from the network device, to obtain a software function.

Subsequently, the terminal may sequentially display user interfaces shown in FIG. 5 to interact with a user, to implement the software function (namely, a function of information extraction for the text with layout). Specifically, the following steps may be included.

Step 1: The terminal displays a first user interface, as shown in (a) in FIG. 5. The first user interface includes an option box 401 of "Enter text with layout", an option box 402 of "Enter a target category", and a start button 403.

The option box 401 is used by the user to enter the text with layout into the terminal. For example, the user may import a compressed package of the text with layout into the software functional module by tapping the option box 401 and selecting a storage path of the compressed package of the text with layout in the terminal.

The option box 402 is used by the user to enter, into the terminal, the target category, namely, the target category of a text block, for example, the foregoing first category and second category. For example, the user may enter text information "the first category (such as Desired job)" in the option box 402.

The start button 403 is used to receive a touch operation of the user, so that the terminal starts to perform the information extraction method. Specifically, after entering corresponding information in the option box 401 and the option box 402, the user may tap the start button 403. After detecting the operation, the terminal starts to perform the information extraction method.

Step 2: After receiving, based on the first user interface, the operation for the start button 403, the terminal performs the information extraction method, for example, performs S101 to S103 shown in FIG. 3; for another example, performs S201 to S204 shown in FIG. 4 by interacting with the network device.

Step 3: The terminal displays a second user interface in a process of performing the information extraction method, as shown in (b) in FIG. 5. The second user interface includes an option box 404 of "Extracting information . . . ".

The option box 404 is used to prompt the user that the terminal is performing an information extraction process. Essentially, the terminal may perform the information extraction process, for example, perform S101 to S103 shown in FIG. 3, or the terminal may interact with the network device to perform the information extraction process, for example, perform S201 to S204 shown in FIG. 4.

Step 4: After completing the information extraction process, the terminal may display a third user interface, as shown in (c) in FIG. 5. The third user interface includes an information extraction result, namely, an identifier of the text block that belongs to the target category and that is in the text with layout. In FIG. 3, an example in which text blocks that belong to the target category and that are in the text with layout are respectively text blocks 1, 3, and 5 is used for description.

It should be noted that a change process of the user interfaces shown in FIG. 5 is merely an example, and constitutes no limitation on the change process of the user interfaces in the information extraction process provided in this embodiment of the present disclosure.

FIG. 6 is a schematic flowchart of a method for training a binary classification model according to an embodiment of the present disclosure. The method is performed by a computer device. The computer device may be a terminal or a network device.

The method shown in FIG. 6 may include the following steps.

S301: The computer device obtains N features of a first category. The N features are features represented by the foregoing feature information at the text block granularity, and N is an integer greater than or equal to 1.

S302: The computer device obtains a training set, where the training set includes a plurality of text blocks that belong to the first category and that are in a plurality of pieces of historical text with layout.

The historical text with layout is known text with layout that includes the text blocks belonging to the first category. Types of different historical text with layout may be the same or different. In addition, templates for different historical text with layout belonging to a same type may be the same or different.

Each piece of historical text with layout may include one or more text blocks of the first category.

In an example, a text block that belongs to the first category and that is in each piece of historical text with layout is manually labeled, and a labeling result is input into the computer device, so that the computer device learns of the text block that belongs to the first category and that is in each piece of historical text with layout.

For example, if the first category is "name", because a resume, an air waybill, or the like generally includes a name, each piece of historical text with layout may be text with layout including a name, for example, the resume or the air waybill. Performing S302 specifically includes: The computer device obtains a text block whose category is "name" in the plurality of pieces of historical text with layout.

S303: The computer device performs feature extraction based on the N features on each of the plurality of text blocks, to obtain a feature combination corresponding to the first category.

In an example, S303 is equivalent to: The computer device separately performs feature extraction for each of the plurality of text blocks by using N feature extractors, to obtain the feature combination corresponding to the first category. A feature corresponding to each of the N feature extractors is a feature represented by one piece of feature information at the foregoing text block granularity.

The feature extractor is a logical functional module for feature extraction. The feature extractor may be implemented by using software, or may be implemented by using hardware, or may be implemented by using software in combination with hardware. This is not limited in embodiments of the present disclosure.

The N features based on the first category may be predefined, for example, predefined based on data information, metadata information, and spatial location information of the text block that is of the first category and that is in the historical text with layout, and a relationship between the text block of the first category and another text block.

S304: The computer device performs training based on a plurality of feature combinations obtained for the plurality of text blocks, to obtain a binary classification model corresponding to the first category.

A specific implementation of the binary classification model is not limited in this embodiment of the present disclosure. For example, the binary classification model may be at least one of the following: a deep neural network (DNN), a support vector machine (SVM), or an extreme gradient boosting (XGBoost).

Figure 7:
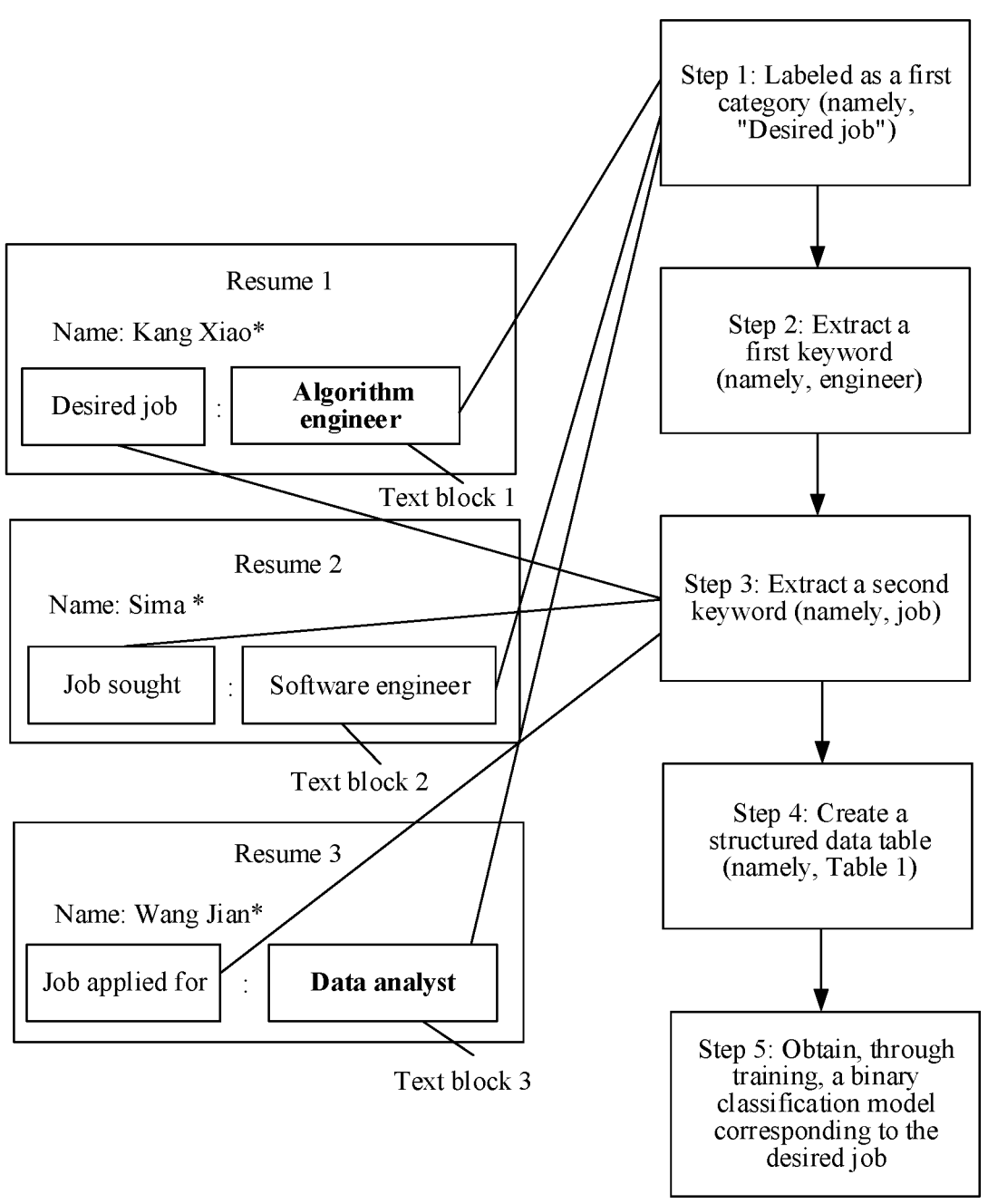
FIG. 7 is a schematic diagram of a specific example of training a binary classification model according to an embodiment of the present disclosure.

FIG. 7 is a schematic diagram of an implementation process of a specific example of S302 to S304.

It is assumed that the plurality of pieces of historical text with layout are three resumes (marked as resumes 1-3), and the first category is "Desired job". After S302 is performed, obtained text blocks that are of the first category and that are in the three historical resumes are respectively text blocks 1-3. S302 corresponds to step 1 in FIG. 7.

In a resume, a text block of "content of the desired job" usually has the following features.

First, the "content of the desired job" usually includes a specific keyword.

Second, the "content of the desired job" is usually highlighted (e.g., displayed in bold) compared to other text blocks.

Third, the "Desired job" is usually a left neighbor of the "content of the desired job", the "Desired job" may be expressed in a plurality of ways, such as "Job sought", "Job applied for", or "Expected job", and these different expressions include specific keywords.

Therefore, it may be learned that, for a text block whose first category is "Desired job", N features may include: whether the text block of the first category includes a first keyword, whether the text block of the first category is bold, whether a left neighbor of the text block of the first category includes a preset second keyword, and the like.

The first keyword may be obtained by the computer device by performing keyword extraction based on data information "Algorithm engineer", "Software engineer", and "Data analyst" of the text blocks 1-3. For example, the first keyword is "engineer". Extraction of the first keyword corresponds to step 2 in FIG. 7.

If data information of left neighbors of the text blocks 1-3 in the resumes 1-3 are respectively "Desired job", "Job sought", and "Job applied for", the second keyword may be obtained by the computer device by performing keyword extraction based on the data information "Desired job", "Job sought", and "Job applied for". For example, the second keyword is "job". Extraction of the second keyword corresponds to step 3 in FIG. 7.

Based on this, a feature extraction result obtained by the computer device by performing S303 may be shown in Table 1. S303 may correspond to step 4 in FIG. 7.

TABLE 1

| Text block | N features | | |
| | Whether the text block is bold | Whether the text block includes the keyword "engineer" | Whether the left neighbor of the text block includes the keyword "job" |
| --- | --- | --- | --- |
| Text block 1 | Yes | Yes | Yes |
| Text block 2 | No | Yes | Yes |
| Text block 3 | Yes | No | Yes |

Based on Table 1, "Yes, Yes, Yes" in a row in which the text block 1 is located is a feature combination obtained by performing feature extraction on the text block 1 based on the N features of the first category (namely, "Desired job"). Based on this, it can be learned that Table 1 includes three feature combinations.

Table 1 is described by using an example in which the feature extraction result, namely, a plurality of feature combinations, forms a structured data table. During actual implementation, a specific storage mode of the plurality of feature combinations is not limited in this embodiment of the present disclosure.

Based on this example, when S304 is performed, training is performed based on the feature combinations in Table 1, to obtain a binary classification model corresponding to the "Desired job". S304 may correspond to step 5 in FIG. 7.

For the binary classification model that corresponds to the "Desired job" and that is obtained based on the example, when the information extraction method shown in FIG. 3 or FIG. 4 is performed, the first category is specifically the "Desired job", and feature information of a target text block is specifically: whether the text block is bold, whether the text block includes the keyword "engineer", and whether a left neighbor of the text block includes the keyword "job".

The method shown in FIG. 7 is described by using an example in which the binary classification model corresponding to the first category is trained. In actual implementation, the computer device may obtain, through training according to the method shown in FIG. 7, binary classification models respectively corresponding to a plurality of categories.

In product implementation, because training a binary classification model uses a large quantity of compute resources and storage resources, the network device generally trains the binary classification model, and publishes a trained binary classification model, so that the terminal may download the binary classification model and perform the information extraction method by using the binary classification model. Alternatively, the network device may directly use the binary classification model to perform the information extraction method. Certainly, this embodiment of the present disclosure does not exclude a technical solution in which the terminal trains a binary classification model and directly uses the binary classification model to perform the information extraction method.

Figure 8:
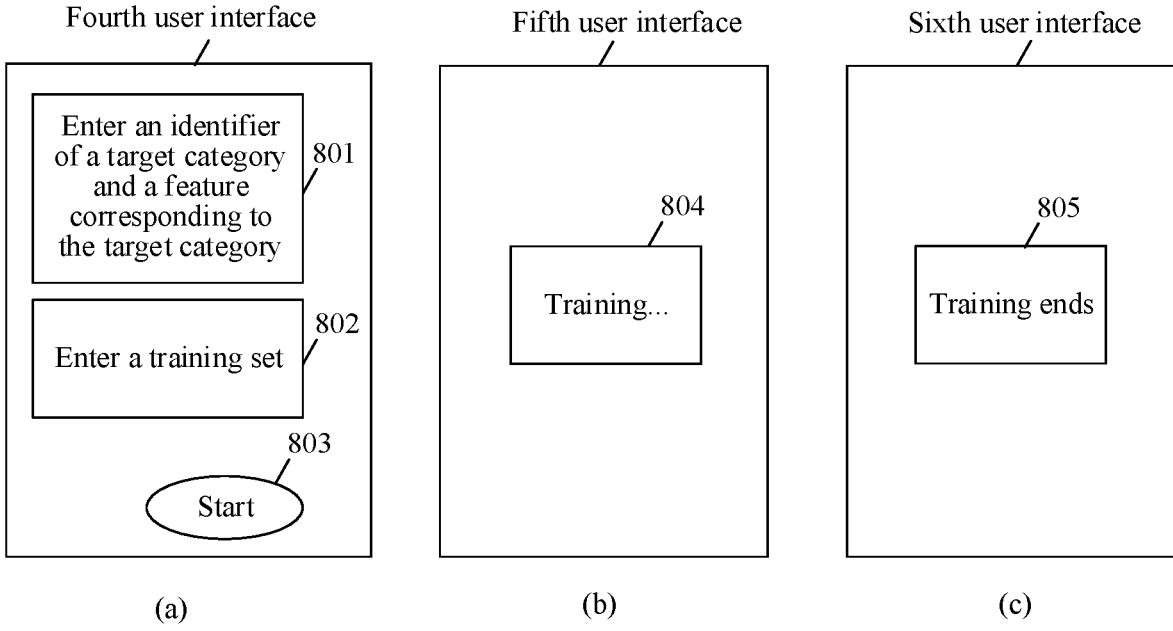
FIG. 8 is a schematic diagram of a change of user interfaces in a process of training a binary classification model according to an embodiment of the present disclosure.

FIG. 8 is a schematic diagram of a change of user interfaces in a process of training a binary classification model according to an embodiment of the present disclosure. Specifically, the following steps may be included.

Step 1: A network device displays a fourth user interface, as shown in (a) in FIG. 8. The fourth user interface includes an option box 801 of "Enter an identifier of a target category and a feature corresponding to the target category", an option box 802 of "Enter a training set", and a start button 803.

The option box 801 indicates a user to enter the identifier of the target category and the feature corresponding to the target category, namely, a category identifier corresponding to the binary classification model trained this time, and a feature at a text block granularity used when a text block of the category is recognized. For example, based on the embodiment shown in FIG. 7, the user may enter "Desired job" in the option box 801 and enter the three features shown in Table 1 in the option box 802.

The option box 802 indicates the user to enter a training set. For example, based on the embodiment shown in FIG. 7, the user may enter "Feature information of the text blocks 1-3" in the option box 802, where features indicated by the feature information herein are three features shown in Table 1.

The start button 803 is used to receive a touch operation of the user, so that the network device starts to perform the method for training the binary classification model. Specifically, after entering corresponding information in the option box 801 and the option box 802, the user may tap the start button 803. After detecting the operation, the network device starts to perform the method for training the binary classification model.

Step 2: After receiving, based on the fourth user interface, the operation performed by the user for the start button 803, the network device starts to perform the method for training the binary classification model, for example, perform the method shown in FIG. 6.

Step 3: In a process of performing the method for training the binary classification model, the network device may display a fifth user interface, as shown in (b) in FIG. 8. The fifth user interface may include an option box 804 of "Training . . . " to prompt the user that the network device is currently training the binary classification model.

Step 4: After training the binary classification model, the network device may display a sixth user interface, as shown in (c) in FIG. 8. The sixth user interface may include an option box 805 of "Training ends", to prompt the user that the network device has completed training on the binary classification model.

It should be noted that a change process of the user interfaces shown in FIG. 8 is merely an example, and constitutes no limitation on a change process of user interfaces in the process of training the binary classification model provided in this embodiment of the present disclosure. In addition, the network device may further test the trained binary classification model, and publish the binary classification model after the test succeeds.

The foregoing mainly describes the solutions provided in embodiments of the present disclosure from the perspective of the methods. To implement the foregoing functions, corresponding hardware structures and/or software modules for performing the functions are included. A person skilled in the art should be easily aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In this embodiment of the present disclosure, functional module division may be performed on an information extraction apparatus for text with layout (e.g., the terminal in the embodiment shown in FIG. 3 or the network device in the embodiment shown in FIG. 4) based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of the present disclosure, module division is an example, and is merely a logical function division. In actual implementation, another division manner may be used.

Figure 9:
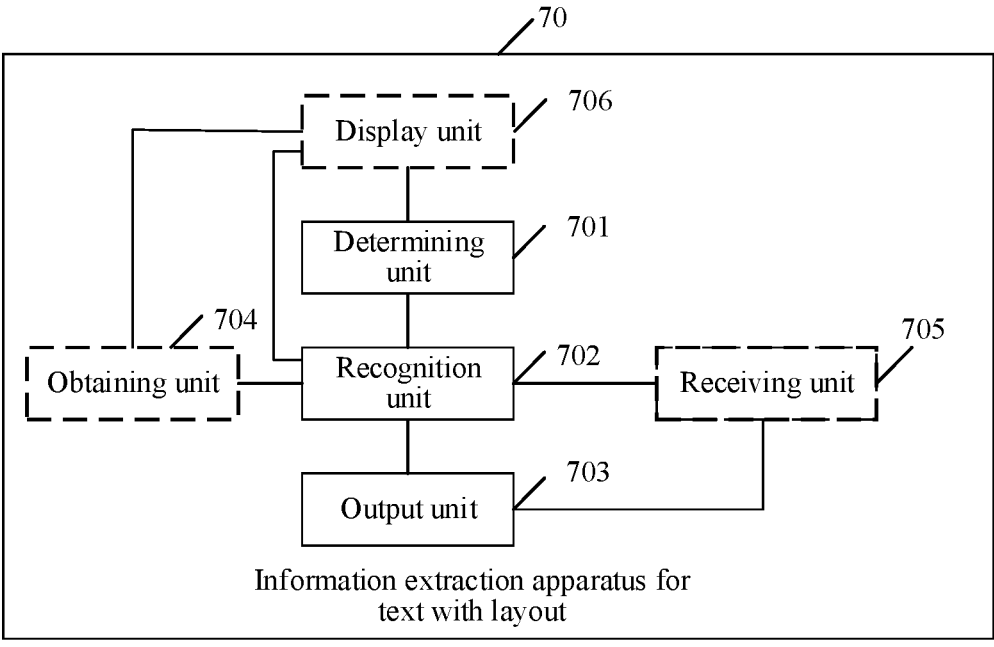
FIG. 9 is a schematic diagram of a structure of an information extraction apparatus for text with layout according to an embodiment of the present disclosure.

FIG. 9 is a schematic diagram of a structure of an information extraction apparatus 70 for text with layout according to an embodiment of the present disclosure. The information extraction apparatus 70 for text with layout is configured to perform the foregoing information extraction method for text with layout. For example, the steps performed by the terminal in the information extraction method for text with layout shown in FIG. 3 are performed. For another example, the steps performed by the network device in the information extraction method for text with layout shown in FIG. 4 are performed. For example, the information extraction apparatus 70 for text with layout may include a determining unit 701, a recognition unit 702, and an output unit 703.

The determining unit 701 is configured to determine that a text block that belongs to a target category and that is in text with layout needs to be extracted. The recognition unit 702 is configured to recognize, based on feature information at a text block granularity, the text block that belongs to the target category and that is in the text with layout. The output unit 703 is configured to output an identifier of the text block that belongs to the first category and that is in the text with layout. For example, with reference to FIG. 3, the determining unit 701 may be configured to perform S101, the recognition unit 702 may be configured to perform S103, and the output unit 703 may be configured to perform S104. For another example, with reference to FIG. 4, the determining unit 701 may be configured to perform a receiving step corresponding to S201, the recognition unit 702 may be configured to perform S203, and the output unit 703 may be configured to perform S204.

Optionally, the recognition unit 702 is further configured to: recognize, based on feature information of a to-be-recognized text block in the text with layout, whether the to-be-recognized text block belongs to the target category.

Optionally, the recognition unit 702 is further configured to: recognize, based on feature information of a target text block in the text with layout, whether a to-be-recognized text block in the text with layout belongs to the target category, where the target text block is a text block that has a preset location relationship with the to-be-recognized text block.

Optionally, the recognition unit 702 is further configured to: recognize, based on feature information of a to-be-recognized text block in the text with layout and feature information of a target text block in the text with layout, whether the to-be-recognized text block belongs to the target category.

Optionally, the target text block is a text block in a preset range of the to-be-recognized text block.

Optionally, the target text block is a text block adjacent to the to-be-recognized text block in a preset orientation of the to-be-recognized text block.

Optionally, the feature information at the text block granularity includes at least one of the following: data information of the text block; metadata information of the text block; or spatial location information of the text block.

Optionally, the data information of the text block includes at least one of the following: a total length of a character string in the text block; whether the text block includes a preset character or a preset character string; a total quantity of preset characters or preset character strings included in the text block; a proportion of preset characters or preset character strings included in the text block to characters in the text block; whether the text block includes a preset keyword; whether the text block includes a preset named entity; or whether the text block includes preset layout information.

Optionally, the metadata information of the text block includes at least one of the following: a font of the text block, a font size of the text block, a color of the text block, whether the text block is bold, whether the text block is italicized, or whether the text block is underlined.

Optionally, the spatial location information of the text block includes at least one of the following: a distance of the text block relative to a page edge of the text with layout; or a distance of the text block relative to a reference text block in the text with layout.

Optionally, the information extraction apparatus 70 for text with layout further includes: an obtaining unit 704 configured to obtain a binary classification model, where the binary classification model represents whether a text block belongs to the target category. In this case, the recognition unit 702 is further configured to: input the feature information at the text block granularity into the binary classification model to obtain an output result.

Optionally, when obtaining the binary classification model, the obtaining unit 704 is further configured to: obtain N features of the target category, where the N features are features represented by the feature information at the text block granularity, and N is an integer greater than or equal to 1; obtain a training set, where the training set includes a plurality of text blocks, and the plurality of text blocks all belong to the target category; perform feature extraction based on the N features on each of the plurality of text blocks, to obtain a feature combination corresponding to the target category; and perform training based on a plurality of feature combinations obtained for the plurality of text blocks, to obtain the binary classification model. For example, with reference to FIG. 6, the obtaining unit 704 may be configured to perform S301 to S304.

Optionally, the information extraction apparatus 70 for text with layout further includes a receiving unit 705.

Optionally, the receiving unit 705 is configured to receive the binary classification model published by a network device.

Optionally, the receiving unit 705 is configured to receive a request message, where the request message is used to request to extract the text block that belongs to the target category and that is in the text with layout.

Optionally, the information extraction apparatus 70 further includes a display unit 706. It should be noted that the output unit 703 and the display unit 706 may be the same or different. For example, when the output unit 703 outputs information in a voice form, the two units may be different; when the output unit 703 outputs information in a text form, the two units may be the same. FIG. 9 is described by using an example in which the two units are different.

Optionally, the display unit 706 is configured to display a first user interface before the determining unit 701 determines that the text block that belongs to the target category and that is in the text with layout needs to be extracted. The first user interface includes first indication information and second indication information, the first indication information indicates a user to enter the text with layout, and the second indication information indicates the user to enter an identifier of the target category.

Optionally, the display unit 706 is configured to display a second user interface in a process in which the recognition unit 702 recognizes, based on the feature information at the text block granularity, the text block that belongs to the target category and that is in the text with layout. The second user interface includes third indication information, where the third indication information indicates that the user is performing an information extraction process.

Optionally, the display unit 706 is configured to display a third user interface. The third user interface includes the identifier of the text block that belongs to the target category and that is in the text with layout.

Optionally, the display unit 706 is configured to display a fourth user interface before the obtaining unit 704 obtains the N features of the target category and the training set. The fourth user interface includes fourth indication information and fifth indication information, the fourth indication information indicates the user to enter the identifier of the target category and the N features, and the fifth indication information indicates the user to enter the training set.

Optionally, the display unit 706 is configured to display a fifth user interface in a process in which the obtaining unit 704 performs training. The fifth user interface includes sixth indication information, where the sixth indication information indicates that the user is training the binary classification model.

For specific descriptions of the foregoing optional manners, refer to the foregoing method embodiments. In addition, for descriptions of any explanation and beneficial effect of the information extraction apparatus 70 for text with layout provided above, refer to the foregoing corresponding method embodiments.

For example, with reference to FIG. 2, some or all functions implemented by the determining unit 701, the recognition unit 702, and the obtaining unit 704 in the information extraction apparatus 70 for text with layout may be implemented by the processor 11 in FIG. 2 by executing program code in the memory 12 in FIG. 2. If the information extraction apparatus 70 for text with layout is a terminal, the output unit 703 may be implemented by using a display apparatus (such as a display screen) and/or a video output apparatus (such as a sound box). If the information extraction apparatus 70 for text with layout is a network device, the output unit 703 may be implemented by using a sending unit in the communication interface 23 in FIG. 2. The receiving unit 705 may be implemented by using a receiving unit in the communication interface 23 in FIG. 2. The display unit 706 may be implemented by using a display apparatus (such as a display).

Figure 10:
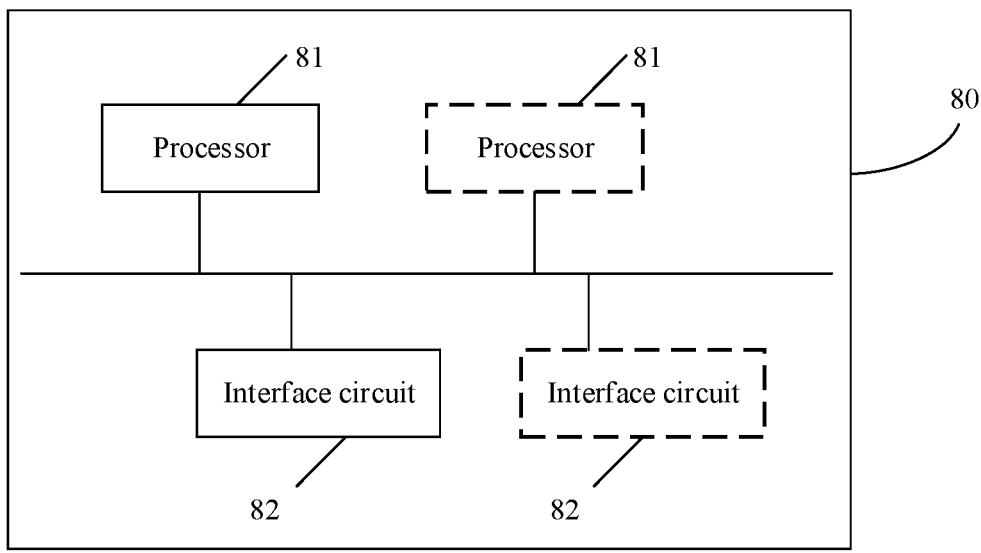
FIG. 10 is a schematic diagram of a structure of a chip system according to an embodiment of the present disclosure.

Embodiments of the present disclosure further provide a chip system. As shown in FIG. 10, the chip system includes at least one processor 81 and at least one interface circuit 82. In an example, when the chip system 80 includes one processor and one interface circuit, the processor may be a processor 81 shown in a solid line box (or a processor 81 shown in a dashed line box) in FIG. 10, and the interface circuit may be an interface circuit 82 shown in a solid line box (or an interface circuit 82 shown in a dashed line box) in FIG. 10. When the chip system 80 includes two processors and two interface circuits, the two processors include the processor 81 shown in the solid line box and the processor 81 shown in the dashed line box in FIG. 10, and the two interface circuits include the interface circuit 82 shown in the solid line box and the interface circuit 82 shown in the dashed line box in FIG. 10. This is not limited.

The processor 81 and the interface circuit 82 may be connected to each other through a line. For example, the interface circuit 82 may be configured to receive a signal (e.g., receive a signal from a vehicle speed sensor or an edge service unit). For another example, the interface circuit 82 may be configured to send a signal to another apparatus (e.g., the processor 81). For example, the interface circuit 82 may read instructions stored in a memory, and send the instructions to the processor 81. When the instructions are executed by the processor 81, an information extraction apparatus for text with layout may perform the steps in the foregoing embodiments. Certainly, the chip system may further include another discrete device. This is not specifically limited in this embodiment of the present disclosure.

Another embodiment of the present disclosure further provides a computer-readable storage medium. The computer-readable storage medium stores instructions. When the instructions are run on an information extraction apparatus for text with layout, the information extraction apparatus for text with layout performs the steps performed by the terminal in the method procedure in the method embodiment shown in FIG. 3, or performs the steps performed by the network device in the method procedure in the method embodiment shown in FIG. 4. In addition, the information extraction apparatus for text with layout may be further configured to perform the steps performed by the computer device in the method procedure in the method embodiment shown in FIG. 6.

In some embodiments, the disclosed methods may be implemented as computer program instructions encoded in a machine-readable format on a computer-readable storage medium or encoded on another non-transitory medium or product.

Figure 11:
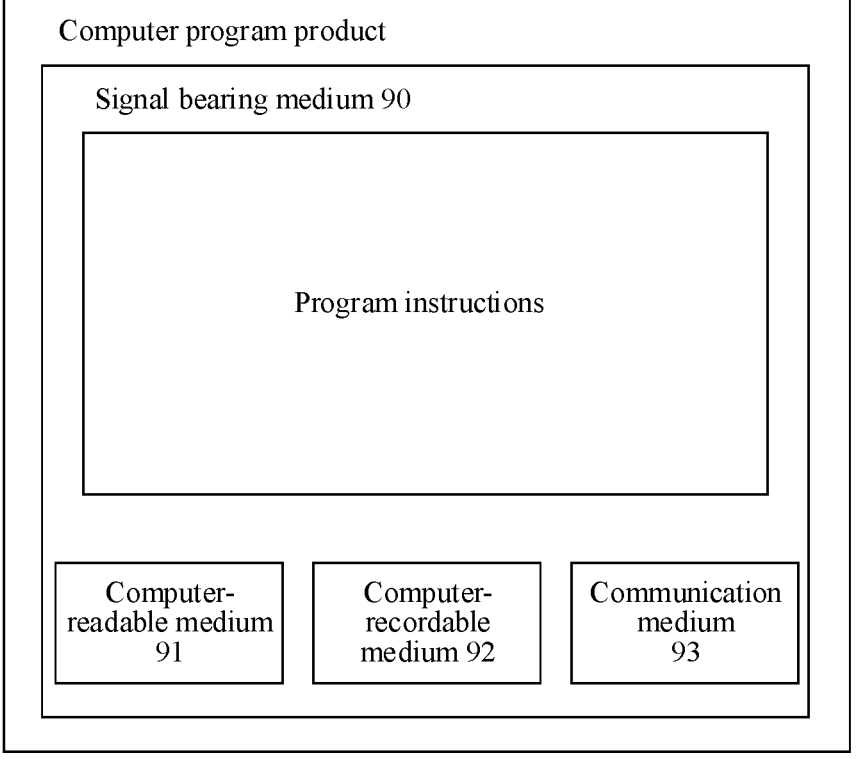
FIG. 11 is a conceptual partial view of a computer program product according to an embodiment of the present disclosure.

FIG. 11 schematically shows a conceptual partial view of a computer program product according to an embodiment of the present disclosure. The computer program product includes a computer program used to execute a computer process on a computing device.

In an embodiment, the computer program product is provided by using a signal bearing medium 90. The signal bearing medium 90 may include one or more program instructions. When the one or more program instructions are run by one or more processors, the functions or a part of the functions described in FIG. 3, FIG. 4, or FIG. 6 may be provided. Therefore, for example, one or more features described with reference to S101 to S104 in FIG. 3 may be borne by the one or more instructions associated with the signal bearing medium 90. In addition, the program instructions in FIG. 11 are also described as example instructions.

In some examples, the signal bearing medium 90 may include a computer-readable medium 91, for example but not limited to, a hard disk drive, a compact disc (CD), a digital video disc (DVD), a digital tape, a memory, a read-only memory (ROM), or a random-access memory (RAM).

In some implementations, the signal bearing medium 90 may include a computer-recordable medium 92, for example but not limited to, a memory, a read/write (R/W) CD, an R/W DVD, or the like.

In some implementations, the signal bearing medium 90 may include a communication medium 93, for example but not limited to, a digital and/or analog communication medium (e.g., an optical fiber cable, a waveguide, a wired communication link, or a wireless communication link).

The signal bearing medium 90 may be conveyed by a communication medium 93 in a wireless form (e.g., a wireless communication medium that complies with the IEEE 802.11 standard or another transmission protocol). The one or more program instructions may be, for example, computer-executable instructions or logic implementation instructions.

In some examples, the information extraction apparatus for text with layout described with respect to FIG. 11 may be configured to provide various operations, functions, or actions in response to one or more program instructions in the computer-readable medium 91, the computer-recordable medium 92, and/or the communication medium 93.

It should be understood that the arrangement described herein is merely used as an example. Therefore, a person skilled in the art appreciates that another arrangement and another element (e.g., a machine, an interface, a function, a sequence, and an array of functions) can be used to replace the arrangement, and some elements may be omitted together depending on a desired result. In addition, many of the described elements are functional entities that can be implemented as discrete or distributed components, or implemented in any suitable combination at any suitable position in combination with another component.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a digital video disc (DVD)), a semiconductor medium (e.g., a solid-state drive (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
training a binary classification model to obtain a trained binary classification model for classifying whether a text block belongs to a target category based on spatial relationships with adjacent text blocks in preset orientations, wherein the adjacent text blocks are text blocks that have a preset location relationship with a first to-be-recognized text block, and wherein the preset orientations include at least one of directly above, directly below, directly left, or directly right;
receiving a text with layout comprising a first text block, wherein the first text block belongs to a target category;
receiving a request message to extract the first text block from the text with layout;
classifying, using the trained binary classification model and based on feature information, the first text block to obtain a first classified text block, wherein the feature information comprises at least one of data information of the first text block, metadata information of the first text block, or spatial location information of the first text block; and
outputting a first identifier of the first classified text block.

2. The method of claim 1, further comprising recognizing, based on the feature information of a to-be-recognized text block in the text with layout, whether the to-be-recognized text block belongs to the target category.

3. The method of claim 1, further comprising:
recognizing, based on a first feature information of a target text block in the text with layout, whether a to-be-recognized text block in the text with layout belongs to the target category; or
recognizing, based on a second feature information of a to-be-recognized text block in the text with layout and the first feature information, whether the to-be-recognized text block belongs to the target category, wherein the target text block is a second text block that has a preset location relationship with the to-be-recognized text block.

4. The method of claim 3, wherein the second text block is in a preset range of the to-be-recognized text block or the second text block is adjacent to the to-be-recognized text block in a preset orientation of the to-be-recognized text block.

5. The method of claim 1, wherein the data information comprises at least one of the following:
a total length of a character string in the first text block;
whether the first text block comprises a preset character or a preset character string;
a total quantity of preset characters or preset character strings comprised in the first text block;
a proportion of preset characters or preset character strings comprised in the first text block to characters in the first text block;
whether the first text block comprises a preset keyword;
whether the first text block comprises a preset named entity; or
whether the first text block comprises preset layout information.

6. The method of claim 1, wherein the metadata information comprises at least one of the following: a font of the first text block, a font size of the first text block, a color of the first text block, whether the first text block is bold, whether the first text block is italicized, or whether the first text block is underlined.

7. The method of claim 1, wherein the spatial location information comprises at least one of the following:
a distance of the first text block relative to a page edge of the text with layout; or
a distance of the first text block relative to a reference text block in the text with layout.

8. The method of claim 1, further comprising displaying a first user interface, wherein the first user interface comprises first indication information and second indication information, the first indication information indicates to a user to enter the text with layout, and the second indication information indicates to the user to enter a second identifier of the target category.

9. The method of claim 8, further comprising displaying a second user interface, wherein the second user interface comprises third indication information indicating that an information extraction process is being performed.

10. The method of claim 9, wherein outputting the first identifier comprises displaying a third user interface comprising the first identifier.

11. The method of claim 1, further comprising inputting the feature information into the binary classification model to obtain an output result, wherein the binary classification model represents whether a text block belongs to the target category.

12. The method of claim 11, further comprising:
obtaining N features of the target category, wherein the N features are features represented by the feature information, and wherein N is an integer greater than or equal to 1;
obtaining a training set comprising a plurality of text blocks belonging to the target category;
performing feature extraction based on the N features on each of the plurality of text blocks to obtain a feature combination corresponding to the target category; and
performing the training based on a plurality of feature combinations obtained for the plurality of text blocks to obtain the binary classification model.

13. The method of claim 12, further comprising displaying a fourth user interface, wherein the fourth user interface comprises fourth indication information and fifth indication information, wherein the fourth indication information indicates to a user to enter a second identifier of the target category and the N features, and wherein the fifth indication information indicates the user to enter the training set.

14. The method of claim 12, wherein performing the training comprises displaying a fifth user interface comprising sixth indication information indicating that the binary classification model is training.

15. The method of claim 11, further comprising receiving the binary classification model from a network device.

16. An information extraction apparatus comprising:

a memory configured to store a computer program; and one or more processors coupled to the memory and configured to execute the computer program to:

train a binary classification model to obtain a trained binary classification model for classifying whether a first text block belongs to a target category based on spatial relationships with adjacent text blocks in preset orientations, wherein the adjacent text blocks are text blocks that have a preset location relationship with a first to-be-recognized text block, and wherein the preset orientations include at least one of directly above, directly below, directly left, or directly right;

receive a text with layout comprising a text block, wherein the text block belongs to a target category;

receive an instruction to extract the text block from the text with layout;

classify, using the trained binary classification model and based on feature information, the text block to obtain a classified text block, wherein the feature information comprises at least one of: data information of the text block, metadata information of the text block, or spatial location information of the text block; and output an identifier of the classified text block.

17. The information extraction apparatus of claim 16, wherein the one or more processors are configured to execute the computer program to recognize, based on the feature information of a to-be-recognized text block in the text with layout, whether the to-be-recognized text block belongs to the target category.

18. The information extraction apparatus of claim 16, wherein the data information comprises at least one of the following:

a total length of a character string in the first text block;

whether the first text block comprises a preset character or a preset character string;

a total quantity of preset characters or preset character strings comprised in the first text block;

a proportion of preset characters or preset character strings comprised in the first text block to characters in the first text block;

whether the first text block comprises a preset keyword;

whether the first text block comprises a preset named entity; or whether the first text block comprises preset layout information.

19. The information extraction apparatus of claim 16, wherein the metadata information comprises at least one a font of the first text block, a font size of the first text block, a color of the first text block, whether the first text block is bold, whether the first text block is italicized, or whether the first text block is underlined, and wherein the spatial location information comprises at least one of a distance of the first text block relative to a page edge of the text with layout, or a distance of the first text block relative to a reference text block in the text with layout.

20. A non-volatile computer-readable storage medium storing a computer program, wherein when the computer program is executed on a computer, the computer is enabled to:

train a binary classification model to obtain a trained binary classification model for classifying whether a first text block belongs to a target category based on spatial relationships with adjacent text blocks in preset orientations, wherein the adjacent text blocks are text blocks that have a preset location relationship with a first to-be-recognized text block, and wherein the preset orientations include at least one of directly above, directly below, directly left, or directly right;

receive a text with layout comprising a text block, wherein the text block belongs to a target category;

receive an instruction to extract the text block from the text with layout;

classify, using the trained binary classification model and based on feature information at, the text block to obtain a classified text block, wherein the feature information comprises at least one of: data information of the text block, metadata information of the text block, or spatial location information of the text block; and output an identifier of the classified text block.

* * * * *